United States Patent
Snider

(10) Patent No.: US 11,420,735 B2
(45) Date of Patent: *Aug. 23, 2022

(54) MULTI-ROTOR NOISE CONTROL BY AUTOMATED DISTRIBUTION PROPULSION

(71) Applicant: Bell Textron Inc., Fort Worth, TX (US)

(72) Inventor: Royce Wayne Snider, Haslet, TX (US)

(73) Assignee: Textron Innovations Inc., Providence, RI (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/580,458

(22) Filed: Sep. 24, 2019

(65) Prior Publication Data
US 2020/0391858 A1 Dec. 17, 2020

Related U.S. Application Data

(63) Continuation-in-part of application No. 16/441,554, filed on Jun. 14, 2019.

(51) Int. Cl.
*B64C 11/30* (2006.01)
*B64C 29/00* (2006.01)
*B64C 27/52* (2006.01)

(52) U.S. Cl.
CPC .............. *B64C 27/52* (2013.01); *B64C 11/30* (2013.01); *B64C 29/0033* (2013.01)

(58) Field of Classification Search
CPC ..... B64C 27/52; B64C 11/30; B64C 29/0033; B64C 2220/00
See application file for complete search history.

(56) References Cited

U.S. PATENT DOCUMENTS

| | | | |
|---|---|---|---|
| 9,235,217 B2 | 1/2016 | Barnes et al. | |
| 10,442,542 B2 * | 10/2019 | Armstrong | B64D 31/06 |
| 2005/0230519 A1 * | 10/2005 | Hurley | B64C 39/08 244/7 C |
| 2017/0349274 A1 * | 12/2017 | Fenny | B64C 27/04 |

(Continued)

*Primary Examiner* — Sze-Hon Kong
*Assistant Examiner* — Chanmin Park
(74) *Attorney, Agent, or Firm* — Shackelford, Bowen, McKinley & Norton, LLP

(57) ABSTRACT

A method of reducing noise generated by a tilt-rotor aircraft includes transitioning the tilt-rotor aircraft into an airplane mode from a helicopter mode, and reducing a speed of a plurality of rotor blades of a first pair of rotors of the tilt-rotor aircraft to be less than a speed of a plurality of rotor blades of a second pair of rotors that are positioned forward of and in-line with the first pair of rotors. A flight control system configured to reduce a noise level of a tilt-rotor aircraft includes a flight control computer comprising a processor, a propulsion system communicatively coupled to the flight control computer, a first pair of rotors and a second pair of rotors communicatively coupled with the flight control computer and the propulsion system. The processor is operable to implement a method that includes transitioning the tilt-rotor aircraft into an airplane mode from a helicopter mode, and reducing a speed and/or pitch of a plurality of rotor blades of the first pair of rotors to be less than a speed and/or pitch of a plurality of rotor blades of the second pair of rotors that are positioned forward of and in-line with the first pair of rotors.

20 Claims, 4 Drawing Sheets

(56) References Cited

U.S. PATENT DOCUMENTS

| | | | |
|---|---|---|---|
| 2018/0208305 A1 | 7/2018 | Lloyd et al. | |
| 2018/0339770 A1* | 11/2018 | Brunken | B64C 29/0033 |
| 2019/0043465 A1* | 2/2019 | Cordourier Maruri | ............. |
| | | | G10K 11/175 |
| 2019/0291856 A1* | 9/2019 | Kaufman | B64C 27/08 |
| 2019/0329882 A1* | 10/2019 | Baity | B64C 29/0033 |
| 2020/0324886 A1* | 10/2020 | Gilbert | B64C 29/0025 |
| 2020/0361601 A1* | 11/2020 | Mikic | B64C 7/00 |

* cited by examiner

MULTI-ROTOR NOISE CONTROL BY AUTOMATED DISTRIBUTION PROPULSION

CROSS-REFERENCE TO RELATED APPLICATIONS

This patent application is a continuation-in-part of U.S. patent application Ser. No. 16/441,554, filed on Jun. 14, 2019, which patent application is incorporated herein by reference.

TECHNICAL FIELD

The present disclosure relates generally to rotor-driven aircraft and more particularly, but not by way of limitation, to reduction of noise generated by rotor-driven aircraft.

BACKGROUND

This section provides background information to facilitate a better understanding of the various aspects of the disclosure. It should be understood that the statements in this section of this document are to be read in this light, and not as admissions of prior art.

Rapid commercial growth and expansion of urban areas often increases the distance from one side of a metropolitan area to another. This rapid commercial growth and expansion often results in an increase in the population, further resulting in more congestion and emissions due to an increased number of vehicles on the current highway infrastructure. As technology further increases, such metropolitan areas will continue to grow, placing serious burden on the current highway infrastructure to handle the increased traffic and furthering the need for improved travel across a metropolitan area that reduces emissions while allowing faster, more convenient, and more efficient travel throughout a metropolitan area and/or between bordering states.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An illustrative method of reducing noise generated by a tilt-rotor aircraft includes transitioning the tilt-rotor aircraft from helicopter mode into an airplane mode and reducing a speed of a plurality of rotor blades of a first pair of rotors of the tilt-rotor aircraft to be less than a speed of a plurality of rotor blades of a second pair of rotors positioned forward of and in-line with the first pair of rotors.

An illustrative flight control system configured to reduce a noise level of a tilt-rotor aircraft includes a flight control computer comprising a processor, a propulsion system communicatively coupled to the flight control computer, a first pair of rotors and a second pair of rotors communicatively coupled with the flight control computer and the propulsion system. The processor is operable to implement a method that includes transitioning the tilt-rotor aircraft into an airplane mode from a helicopter mode, and reducing a pitch of a plurality of rotor blades of a first pair of rotors of the tilt-rotor aircraft to be less than a pitch of a plurality of rotor blades of a second pair of rotors positioned forward of and in-line with the first pair of rotors.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various aspects will now be described more fully with reference to the accompanying drawings. The disclosure may, however, be embodied in many different forms and should not be construed as limited to the aspects set forth herein.

Figure 1:
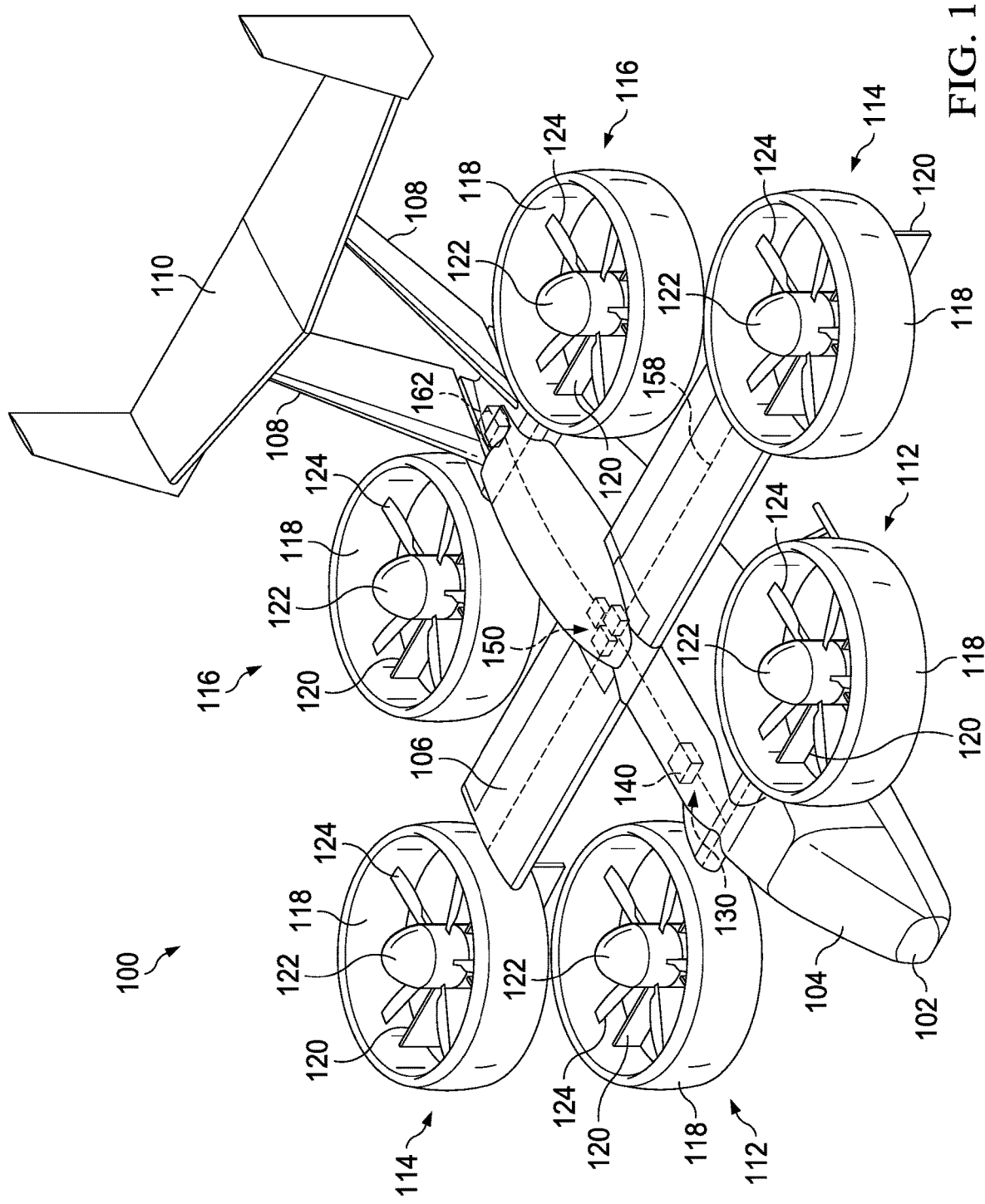
FIG. 1 is a perspective view of an aircraft oriented in a helicopter mode according to aspects of the disclosure.
Figure 2:
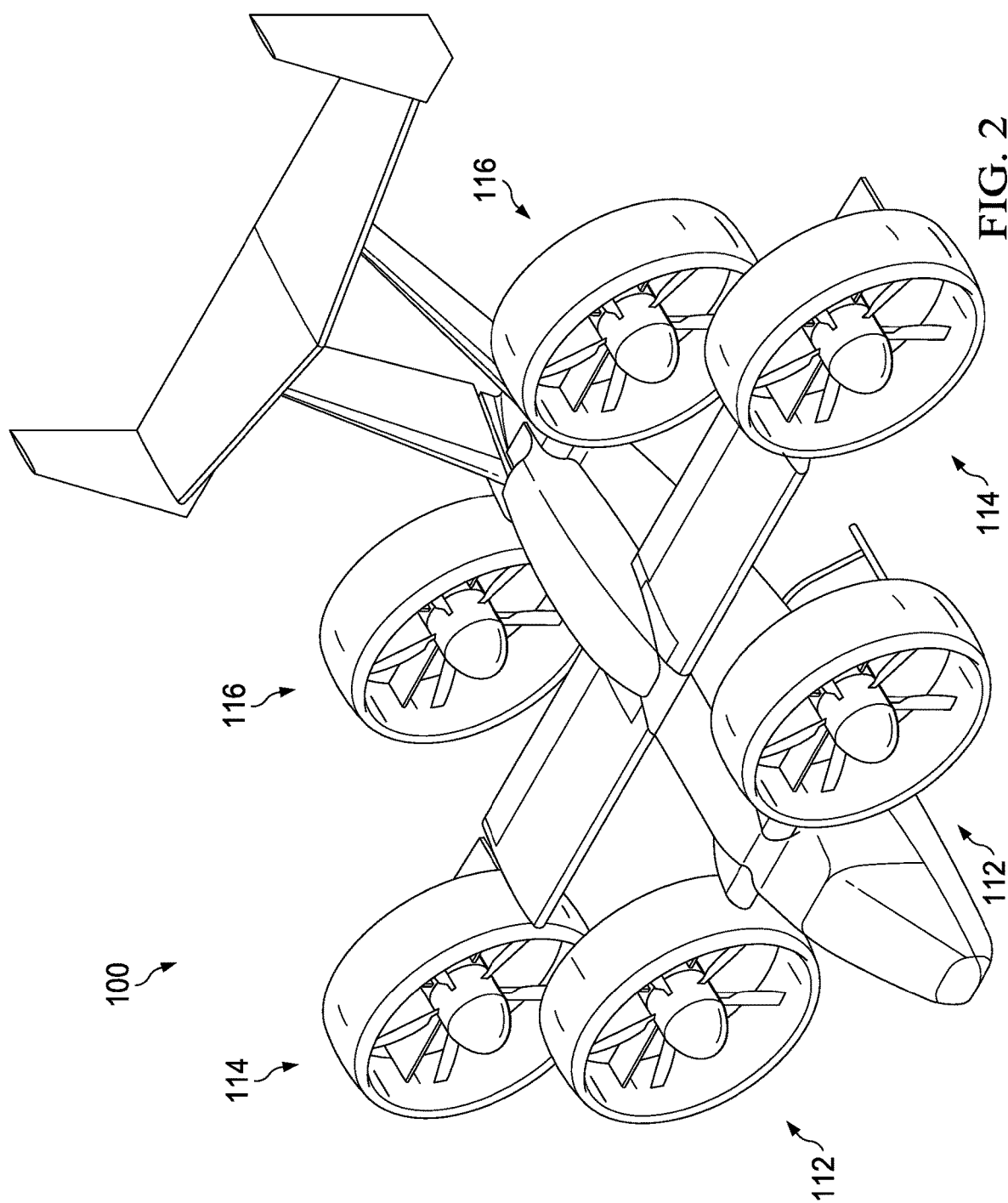
FIG. 2 is a perspective view of an aircraft oriented in an airplane mode according to aspects of the disclosure.

Referring now to FIGS. 1 and 2, perspective views of an aircraft 100 operating in helicopter and airplane modes, respectively, are shown according to aspects of the disclosure. Aircraft 100 is generally configured as a vertical takeoff and landing (VTOL) aircraft, more specifically a tiltrotor, that is operable in an airplane mode associated with forward flight and a helicopter mode associated with VTOL to a landing zone. Aircraft 100 comprises a fuselage 102, a cockpit and/or passenger compartment 104, wings 106 extending from the fuselage 102, vertical stabilizers 108, a horizontal stabilizer 110, a pair of rotors 112 carried by, supported by and/or otherwise coupled to fuselage 102, a pair of rotors 114 carried by, supported by, and/or otherwise coupled to wings 106, and a pair of rotors 116 carried by, supported by, and/or otherwise coupled to fuselage 102. The pairs of rotors 112, 114, 116 are arranged about fuselage 102 to be generally coplanar when aircraft 100 is in helicopter and airplane mode. Aircraft 100 also includes a flight control system 130 (e.g., see FIG. 3) that includes a flight control computer 140 and a propulsion system 150, both of which are communicatively coupled with rotors 112, 114, and 116.

The pair of rotors 112 are supported by a rotatable shaft extending at least partially through fuselage 102 and coupled to the pair of rotors 112. The pair of rotors 112 may be selectively rotated with respect to fuselage 102 by at least one actuator (e.g. electric, electro-mechanical, magnetic, and/or hydraulic) in order to transition aircraft 100 between the airplane mode and the helicopter mode. Each rotor 112 comprises a duct 118 having a plurality of structural supports and/or struts 120. In some aspects, outer surfaces of the ducts 118 may be shaped to provide optimal and/or preferred flight characteristics in at least one of the airplane mode and the helicopter mode. It will be appreciated that the rotor systems 122 of each rotor 112 rotate in opposing directions with respect to one another to balance the torque generated by each rotor 112.

Each rotor of the pair of rotors 112 comprises a single rotor system 122 having a plurality of rotor blades 124 attached thereto. The rotor blades 124 are disposed within the duct 118 and configured to generate thrust when selectively rotated. In some aspects, rotor blades 124 are fixed pitched rotor blades and in other aspects rotor blades 124 are variable pitch rotor blades (e.g., the pitch of the rotor blades may be controlled collectively). As illustrated in FIG. 1, each rotor system 122 comprises four rotor blades 124. However, in other aspects, each rotor system 122 may comprise two, three, five, six, seven, eight, and/or more rotor blades 124.

Each wing 106 carries a single rotor of the pair of rotors 114. The pair of rotors 114 are supported by a rotatable shaft extending at least partially through wings 106 and coupled to the pair of rotors 114. The pair of rotors 114 may be selectively rotated with respect to fuselage 102 by at least one actuator (e.g. electric, electro-mechanical, magnetic, and/or hydraulic) in order to transition aircraft 100 between the airplane mode and the helicopter mode. The pair of rotors 114 are structurally similar to the pair of rotors 112 and each rotor of the pair of rotors 114 includes its own duct 118, struts 120, single rotor system 122, and plurality of rotor blades 124. Compared to the pair of rotors 112, the pair of rotors 114 are disposed further outboard of fuselage 102. In some aspects, the pair of rotors 114 are positioned outboard of fuselage 102 so as to prevent or limit overlap between ducts 118 of the pair of rotors 112 and 114 and in between the pair of rotors 114 and 116.

The pair of rotors 116 are supported by a rotatable shaft extending at least partially through fuselage 102 and coupled to the pair of rotors 116. The pair of rotors 116 may be selectively rotated with respect to fuselage 102 by at least one actuator (e.g. electric, electro-mechanical, magnetic, and/or hydraulic) in order to transition aircraft 100 between the airplane mode and the helicopter mode. The pair of rotors 116 are structurally similar to the pair of rotors 112, 114 and each rotor of the pair of rotors 116 includes its own duct 118, struts 120, single rotor system 122, and plurality of rotor blades 124. The pair of rotors 116 are generally disposed in-line with the pair of rotors 112 when aircraft 100 operates in airplane mode (e.g., see FIG. 2). As used herein, "disposed in-line" is used to mean that a first pair of rotors (e.g., the pair of rotors 116) are positioned such that in airplane mode the first pair of rotors ingest at least some turbulent air generated by a second pair of rotors (e.g., the pair of rotors 112) or a portion of aircraft 100 (e.g., fuselage, cockpit, passenger compartment, wings) positioned forward of the first pair of rotors. In a typical aspect, "disposed in-line" means that, in airplane mode, an axis of rotation of a first pair of rotors and a second pair of rotors are co-linear or generally parallel to one another and offset less than one rotor diameter. In a typical aspect, "disposed out of line" is used to mean that, in airplane mode, an axis of rotation of a first pair of rotors and a second pair of rotors are generally parallel to one another and offset more than one rotor diameter.

Aircraft 100 is controlled via flight control system 130. Flight control system 130 includes flight control computer 140 that is connected to and in communication with propulsion system 150. Flight control computer 140 is configured to selectively control the components of propulsion system 150 to operate aircraft 100. Flight control computer 140 may include one or more systems 300, each of which includes a processor 310 that is operable to implement the methods disclosed herein. An illustrative system 300 is discussed in more detail relative to FIG. 3.

Flight control system 130 may include flight control input hardware (e.g. flight controls 142) configured to receive inputs and/or commands from a pilot to control operation of the aircraft 100 and/or a plurality of sensors and/or gauges configured to provide feedback regarding operational characteristics of aircraft 100 to the flight control computer 140. Additionally, flight control computer 140 may be configured to selectively control the operation, orientation, rotation, position, pitch, and/or rotational speed of the pairs of rotors 112, 114, 116. In some aspects, flight control system 130 may comprise fly-by-wire architecture for controlling aircraft 100. In some aspects, flight control system 130 may be capable of optionally-piloted operation. In some aspects, flight control system 130 may comprise collective pitch control for adjusting the pitch of any of the plurality of rotor blades 124 of each of the pairs of rotors 112, 114, 116 and rotational speed control for individually adjusting a rotational speed of rotor systems 122 of each of the pairs of rotors 112, 114, 116, without the need for cyclic control for controlling operation of aircraft 100.

Propulsion system 150 is controlled by flight control computer 140 and includes components that assist with the flight of aircraft 100. Propulsion system 150 may include one or more turbine engines 152 that are coupled to rotors 112, 114, 116 via one or more gearboxes 154 and one or more drive shafts 156 (see FIG. 3). As illustrated in FIGS. 1 and 2, the pair of rotors 114 are positioned outboard of the pair of rotors 112, 116. Positioning the pair of rotors 114 in this way provides space for wings 106 and also moves the pair of rotors 114 out of downstream alignment with the pair of rotors 112 when aircraft 100 operates in the airplane mode (e.g., see FIG. 2). Positioning the pair of rotors 114 out of downstream alignment with the pair of rotors 112 allows the pair of rotors 114 to ingest cleaner (i.e., less turbulent) air. Ingesting cleaner air increases efficiency and performance of the pair of rotors 114 and reduces an amount of noise created by the pair of rotors 114. For a given rotor rpm, the noise levels generated by a rotor are increased when ingesting turbulent air compared to the noise levels generated when ingesting less turbulent/clean air.

In contrast to the pair of rotors 114, the pair of rotors 116 are positioned in-line with the pair of rotors 112 when aircraft 100 operates in airplane mode (e.g., see FIG. 2). When operating in helicopter mode (e.g., see FIG. 1), the placement of rotors 112, 114, and 116 as illustrated in FIGS. 1 and 2 is ideal for VTOL and hovering. However, when operating in airplane mode, placement of rotors 112, 114, and 116 is less optimal due to the axial alignment of the pair of rotors 112 with the pair of rotors 116. During airplane mode, the pair of rotors 116 may ingest turbulent air exhausted by the pair of rotors 112, 114 (or generated from air passing over the fuselage, cockpit, passenger compartment, wings, etc.). Ingestion of turbulent air reduces efficiency and performance of the pair of rotors 116 and also increases noise generated by the pair of rotors 116. In some situations, the amount of noise generated by aircraft 100 is of particular concern. For example, commercial aircraft are subject to certain operating parameters, including noise certification. To reduce the noise level output by the pair of rotors 116, a pitch and/or a speed of the rotor systems 122 of the pair of rotors 116 is reduced. The pitch of the plurality of rotor blades 124 of the pair of rotors 116 may be changed using conventional collective pitch control systems similar to the collective pitch control systems found on existing tiltrotor aircraft. For example, each rotor blade is coupled to a pitch link, the movement of which articulates the rotor blade through a range of pitch. The speed of the plurality of rotor blades 124 of the pair of rotors 116 may be reduced using gearboxes 154 and/or reducing a speed of propulsion system 150. For example, each rotor of the pairs of rotors 112, 114, 116 may be coupled to a gearbox configured with two or more output speeds (e.g., a high-speed output and a low-speed output similar to conventional tiltrotor aircraft).

Figure 3:
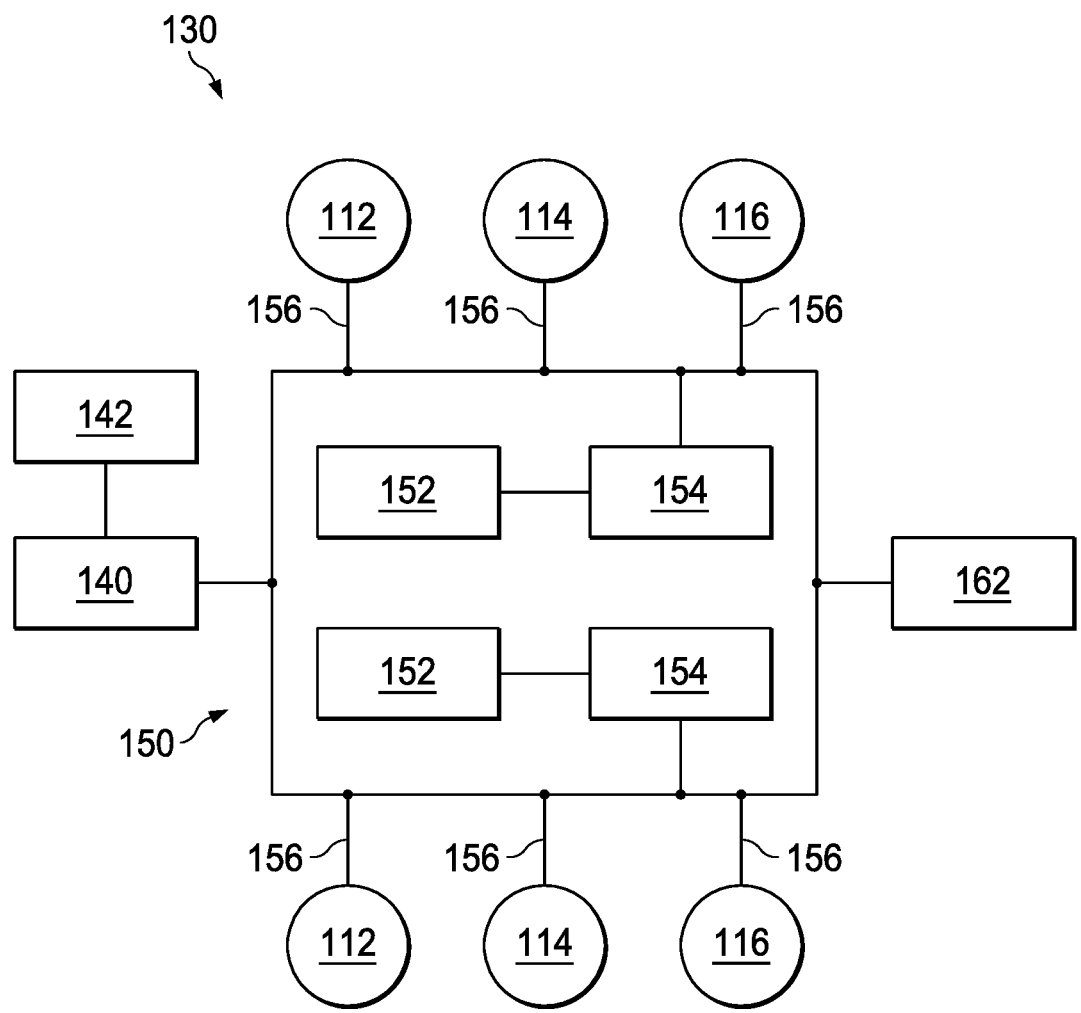
FIG. 3 is a schematic diagram of an exemplary aircraft, according to aspects of the disclosure.

Referring now to FIG. 3, a schematic diagram of aircraft 100 illustrating flight control system 130 is shown according to aspects of the disclosure. Flight control system 130 includes flight control computer 140 and propulsion system 150. In the illustrative aspect of FIG. 3, aircraft 100 includes two turbine engines 152 and two gearboxes 154, with one engine-gearbox pair powering rotors 112, 114, 116 on a first side of aircraft 100 and the second engine-gearbox pair powering rotors 112, 114, 116 on a second side of aircraft 100. In some aspects, propulsion system 150 may include a single engine-gearbox pair that powers all rotors of the pairs of rotors 112, 114, 116. In some aspects, each gearbox 154 is configured to operate at two speeds (e.g., a high speed for helicopter mode and a low speed for airplane mode). In some aspects, each gearbox 154 is configured to operate at three or more output speeds.

In some aspects, propulsion system 150 may include an engine-gearbox pair for each rotor 112, 114, 116. In these aspects the gearboxes associated with rotors 112, 114 are configured to operate at a first speed and a second speed and the gearboxes associated with rotors 116 are configured to operate at a first speed and a third speed. The first speeds of all gearboxes are equal and are used for helicopter mode. The third speed of the gearboxes associated with rotors 116 is slower than the second speed of the gearboxes associated with rotors 112, 114. The slower speed is used for rotors 116 during airplane mode to minimize the amount of noise created by rotors 116.

Flight control system 130 includes flight controls 142. Flight controls 142 can include various actuators, servos, and the like for controlling aircraft 100 during flight. For example, flight controls 142 may include actuators to control flaps, ailerons, tilt of the pairs of rotors 112, 114, 116, pitch of the plurality of rotor blades 124 of the pairs of rotors 112, 114, 116, landing gear, and the like.

During VTOL, the pairs of rotors 112, 114, 116 are oriented in helicopter mode as shown in FIG. 1. Flight control computer 140 controls pitch of the plurality of rotor blades 124 of rotors 112, 114, 116 to provide the needed control authority to maintain control of aircraft 100 during takeoff and landing. For example, thrust generated by each rotor 112, 114, 116 is individually controlled through collectively controlling the pitch of the rotor blades 124 thereof to maintain desired orientation of aircraft 100. To transition to airplane mode, flight control system 130 rotates rotors 112, 114, 116 into the orientation shown in FIG. 2.

When operating in airplane mode, the speed of the plurality of rotor blades 124 of the pairs of rotors 112, 114, 116 is typically reduced as airplane mode requires less rotor speed to maintain flight as compared to helicopter mode. For example, helicopter mode may require rotor speed in the 80-90% range and airplane mode may only require around 60% rotor speed. These values are illustrative and may vary. Speed reduction of rotors 112, 114, 116 may be accomplished via gearboxes 154. For example, when transitioning from helicopter to airplane mode, torque transmission from turbine engines 152 is reduced by shifting gearboxes 154 from their high-speed output to their low-speed output. In some aspects, rotor speed can be reduced by reducing a speed/power of turbine engines 152. However, in typical aspects, the speed of turbine engines 152 is held constant to maximize their efficiency and the speed of rotors 112, 114, 116 is instead manipulated via gearboxes 154.

In airplane mode, each rotor 112, 114, 116 has traditionally been operated at the same speed. However, it has been discovered that operating the pair of rotors 116 at the same speed as the pair of rotors 112 results in increased noise generated by aircraft 100 during flight. The increased noise is a result of the pair of rotors 116 ingesting turbulent air created by the pair of rotors 112 (or generated from air passing over the fuselage, cockpit, passenger compartment, wings, etc.) that are located upwind of the pair of rotors 116. In one aspect, the amount of noise generated by the pair of rotors 116 is reduced by reducing a speed of the pair of rotors 116. For example, gearboxes 154 are shifted from their high-speed output to their low-speed output to reduce a speed of rotor systems 122 of the pair of rotors 116. In one aspect, the amount of noise generated by the pair of rotors 116 is reduced by reducing a pitch of the plurality of rotor blades 124 of the pair of rotors 116. Reducing the pitch of the plurality of rotor blades 124 of the pair of rotors 116 reduces the amount of thrust produced by the pair of rotors 116 by reducing the amount of "bite" the rotor blades have relative to the surrounding air, which in turn reduces the amount of noise created by the pair of rotors 116. The pitch of rotor blades 124 may be controlled via flight control system 130. For example flight control system 130 actuates a motor or servo that adjusts the position of pitch links coupled to the plurality of rotor blades 124 of the pair of rotors 116.

In some aspects, flight control computer 140 may increase the pitch of the plurality or rotor blades 124 of either or both of the pairs of rotors 112, 114 to make up for the reduced thrust provided by the pair of rotors 116. This load balancing is an automated distribution of torque. For example, the plurality of rotor blades 124 of the pairs of rotors 112, 114 operate at a first pitch and the plurality of rotor blades 124 of the pair of rotors 116 operate at a second pitch that is reduced compared to the first pitch. Operating the pairs of rotors 112, 114 and the pair of rotors 116 at two different pitches reduces the noise generated by aircraft 100 while maintaining the torque needed to maintain flight in airplane mode.

In another aspect, automated distribution of torque can be accomplished by operating the plurality of rotor blades 124 of the pair of rotors 112 at a first pitch, operating the plurality of rotor blades 124 of the pair of rotors 114 a second pitch, and operating the plurality of rotor blades 124 of the pair of rotors 116 at a third pitch, wherein the first pitch is greater than the second pitch and the second pitch is greater than the third pitch. Reducing the pitch of the plurality of rotor blades 124 of the pair of rotors 114 may further reduce noise when, for example, the position of the pair of rotors 114 partially axially overlaps with the pair of rotors 112. In another aspect, automated distribution of torque can be accomplished by operating the plurality of rotor blades 124 of the pair of rotors 112 at a first pitch, operating the plurality of rotor blades 124 of the pair of rotors 114 a second pitch, and operating the plurality of rotor blades 124 of the pair of rotors 116 at a third pitch, wherein the second pitch is greater than the first pitch and the first pitch is greater than the third pitch. Reducing the pitch of the pair of rotors 112 relative to the pair of rotors 114 further reduces the noise generated by the pair of rotors 116 be reducing the amount of turbulent air generated by the pair of rotors 112. In this configuration, the plurality of rotor blades 124 of the pair of rotors 114 may need to be operated at a higher pitch to provide the needed amount of thrust.

In some aspects, flight control system 130 includes a sensor 162 that monitors noise. Flight control computer 140 receives data from sensor 162 to monitor an amount of noise generated by aircraft 100. Sensor 162 can be a microphone, a seismometer, accelerometer or the like for measuring a noise or vibration level. Flight control computer 140 may use a feedback loop to control a pitch of the plurality of rotor blades 124 of the pair of rotors 116 based upon data received from sensor 162. In some aspects, flight control system 130 may include multiple sensors 162. For example, each rotor of the pair of rotors 116 may have its own sensor 162 positioned proximal thereto. In some aspects, each rotor of the pairs of rotors 112, 114, 116 may have its own sensor 162. Flight control computer 140 may, via a feedback loop, make reductions to the pitch of the plurality of rotor blades 124 of the pair of rotors 116 while at the same time balancing the amount of total thrust needed to maintain flight by adjusting the pitch of the plurality of rotor blades 124 of the pairs of rotors 112, 114.

Figure 4:
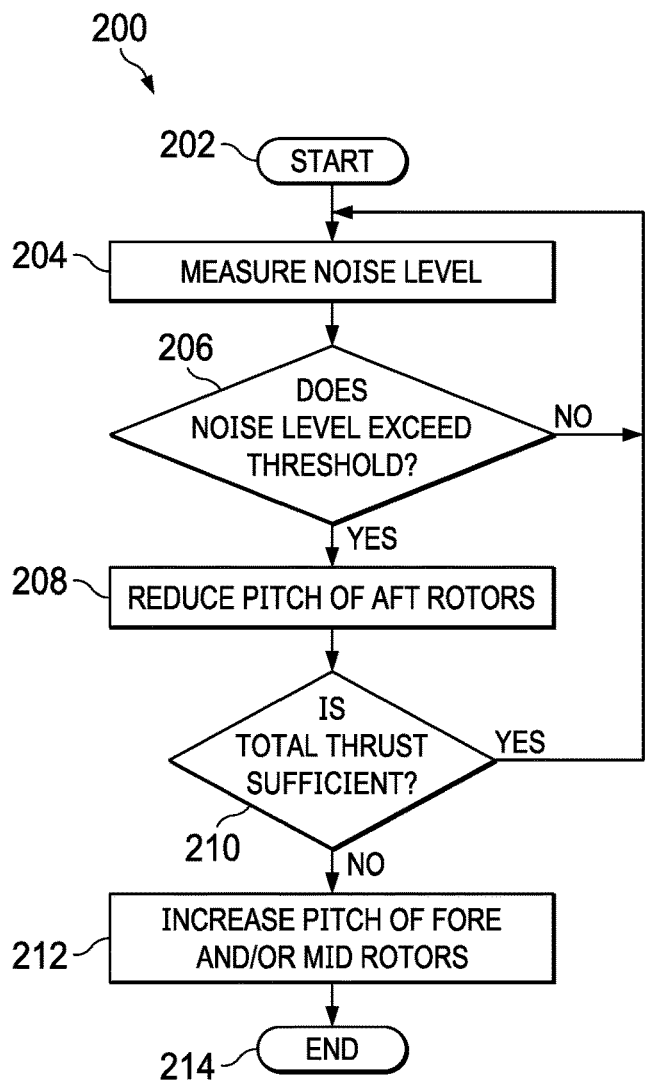
FIG. 4 is a flow diagram illustrating a method of reducing noise produced by an aircraft according to aspects of the disclosure.

FIG. 4 is a flow diagram illustrating a method 200 for controlling a noise level of aircraft 100 according to aspects of the disclosure. In some aspects, steps of method 200 are performed automatically by flight control system 130 upon transitioning to airplane mode from helicopter mode. Method 200 begins at step 202. In step 202 aircraft 100 transitions to airplane mode. After aircraft 100 has transitioned to airplane mode, method 200 proceeds to step 204.

In step 204, a noise of level of aircraft 100 is measured. For the purposes of this disclosure, noise level is used to include both sound levels and/or vibration levels. For example, sensor 162 measures a noise level associated with the pair of rotors 116. In some aspects, two sensors 162 are used, with one proximal each rotor of the pair of rotors 116. In some aspects, at least one sensor 162 is positioned proximal to each rotor 112, 114, 116 of aircraft 100. Method 200 then proceeds to step 206.

In step 206, flight control computer 140 compares the noise level measured by sensor(s) 162 to a threshold noise level. The threshold noise level is a predetermined noise level that may be based upon noise restriction requirements or may be specified by a user. If flight control computer 140 determines that the measured noise level is greater than the threshold noise level, method 200 proceeds to step 208. If flight control computer 140 determines that the measured noise level is less than the threshold noise level and/or vibration, method 200 either returns to step 204 or method 200 ends.

In step 208, flight control computer 140 reduces a pitch of the plurality of rotor blades 124 of the pair of rotors 116 to reduce an amount of thrust and noise produced by the pair of rotors 116. The pitch of the pair of rotors 116 is reduced by moving pitch links that are coupled to each rotor blade 124 of the plurality of rotor blades 124 of the pair of rotors 116. In some aspects method 200 then proceeds to step 210.

In step 210, flight control computer 140 compares an amount of thrust produced by rotors 112, 114, and 116 to a threshold thrust level. The threshold thrust level is an amount of thrust needed to maintain a desired flight characteristic. If flight control computer 140 determines that the amount of total thrust being produced by rotors 112, 114, and 116 is less than the threshold thrust level, method 200 proceeds to step 212. If flight control computer 140 determines that the amount of thrust being produced by rotors 112, 114, and 116 is greater than or equal to the threshold thrust level, method 200 proceeds to step 214 and method 200 ends. Alternatively, method 200 can return to step 204 to continue to monitor the noise level of aircraft 100.

In step 212, flight control computer 140 increases a pitch of one or both of the plurality of rotors 124 of the pair of rotors 112 and the pair of rotors 114 to provide additional thrust to satisfy the threshold thrust level. The pitch of the pair of rotors 112 and/or the pair of rotors 114 is increased by moving pitch links that are coupled to each rotor blade 124 of the pair of rotors 112 and the pair of rotors 114. Method 200 then ends at step 214 or optionally returns to step 204 to again measure the noise level.

Method 200 can be used to automatically tune the pitch of the plurality of rotor blades 124 of the pairs of rotors 112, 114, 116 to reduce noise levels of aircraft 100 and to distribute torque across the pairs of rotors 112, 114, 116. It will be appreciated by those having skill in the art that method 200 could be used with aircraft having fewer than six rotors and aircraft having more than six rotors. As an alternative to method 200, flight control computer 140 can simply reduce the pitch of the plurality of rotor blades 124 of the pair of rotors 116 without monitoring sensor data. The amount of such pitch reduction could be based upon empirically determined data.

Figure 5:
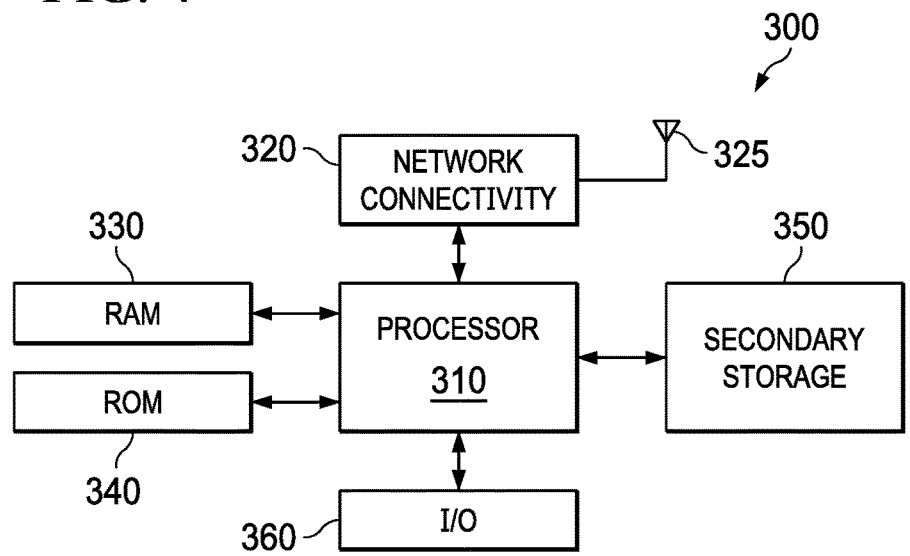
FIG. 5 is a schematic diagram of a general-purpose processor (e.g. electronic controller or computer) system suitable for implementing aspects of the disclosure.

Referring now to FIG. 5, a schematic diagram of a general-purpose processor (e.g. electronic controller or computer) system 300 suitable for implementing the aspects of this disclosure is shown. System 300 includes processing component and/or processor 310 suitable for implementing one or more aspects disclosed herein. In some aspects, flight control computer 140 and/or other electronic systems of aircraft 100 may include one or more systems 300. In addition to processor 310 (which may be referred to as a central processor unit or CPU), system 300 might include network connectivity devices 320, random access memory (RAM) 330, read only memory (ROM) 340, secondary storage 350, and input/output (I/O) devices 360. In some cases, some of these components may not be present or may be combined in various combinations with one another or with other components not shown. These components might be located in a single physical entity or in more than one physical entity. Any actions described herein as being taken by the processor 310 might be taken by the processor 310 alone or by the processor 310 in conjunction with one or more components shown or not shown in the system 300. It will be appreciated that the data described herein can be stored in memory and/or in one or more databases.

Processor 310 executes instructions, codes, computer programs, or scripts that it might access from the network connectivity devices 320, RAM 330, ROM 340, or secondary storage 350 (which might include various disk-based systems such as hard disk, floppy disk, optical disk, or other drive). While only one processor 310 is shown, multiple processors 310 may be present. Thus, while instructions may be discussed as being executed by processor 310, the instructions may be executed simultaneously, serially, or otherwise by one or multiple processors 310. The processor 310 may be implemented as one or more CPU chips and/or application specific integrated chips (ASIC s).

The network connectivity devices 320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 320 may enable the processor 310 to communicate with the Internet or one or more telecommunications networks or other networks from which the processor 310 might receive information or to which the processor 310 might output information.

The network connectivity devices 320 might also include one or more transceiver components 325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 325 might include separate receiving and transmitting units or a single transceiver. Information transmitted or received by the transceiver component 325 may include data that has been processed by the processor 310 or instructions that are to be executed by processor 310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

RAM 330 might be used to store volatile data and perhaps to store instructions that are executed by the processor 310. The ROM 340 is a non-volatile memory device that typically has a smaller memory capacity than the memory capacity of the secondary storage 350. ROM 340 might be used to store instructions and perhaps data that are read during execution of the instructions. Access to both RAM 330 and ROM 340 is typically faster than to secondary storage 350. The secondary storage 350 is typically comprised of one or more disk drives or tape drives and might be used for non-volatile storage of data or as an over-flow data storage device if RAM 330 is not large enough to hold all working data. Secondary storage 350 may be used to store programs or instructions that are loaded into RAM 330 when such programs are selected for execution or information is needed.

The I/O devices 360 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, transceiver 325 might be considered to be a component of the I/O devices 360 instead of or in addition to being a component of the network connectivity devices 320. Some or all of the I/O devices 360 may be substantially similar to various components disclosed herein and/or may be components of any of flight control system 130 and/or other electronic systems of aircraft 100.

Depending on the aspect, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain aspects, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other aspects are possible in which these tasks are performed by a different entity.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular aspect.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of reducing noise generated by a tilt-rotor aircraft operating in an airplane mode, the method comprising:
    operating the tilt-rotor aircraft in the airplane mode, in which mode a second pair of rotors of the tilt-rotor aircraft generates turbulent air and a first pair of rotors of the tilt-rotor aircraft ingests at least some of the turbulent air, wherein the first pair of rotors are supported by and coupled to a first rotatable shaft extending through a fuselage and the second pair of rotors are supported by and coupled to a second rotatable shaft extending through the fuselage;
    reducing a speed of a plurality of rotor blades of the first pair of rotors to be less than a speed of a plurality of rotor blades of the second pair of rotors, thereby reducing noise generated by each of the first pair of rotors and the second pair of rotors;
    wherein the second pair of rotors is positioned forward of and in-line with the first pair of rotors; and
    wherein an axis of rotation of the first pair of rotors and the second pair of rotors are co-linear.

2. The method of claim 1, wherein the tilt-rotor aircraft comprises a third pair of rotors.

3. The method of claim 2, wherein the third pair of rotors is positioned out of line with the first pair of rotors.

4. The method of claim 2, comprising setting a speed of a plurality of rotor blades of the third pair of rotors equal to the speed of the plurality of rotor blades of the first pair of rotors.

5. The method of claim 2, comprising setting a speed of the plurality of rotor blades of the third pair of rotors to be greater than the speed of the plurality of rotor blades of the first pair of rotors.

6. The method of claim 2, comprising setting a speed of the plurality of rotor blades of the third pair of rotors to be less than the speed of the plurality of rotor blades of the first pair of rotors.

7. The method of claim 1, comprising:
measuring, prior to the reducing the speed of the plurality of rotor blades of the first pair of rotors, a noise level of the first pair of rotors; and
determining if the noise level exceeds a threshold noise level.

8. The method of claim 7, comprising:
measuring, after the reducing the speed of the plurality of rotor blades of the first pair of rotors, the noise level of the first pair of rotors;
determining if the noise level is below the threshold noise level; and
responsive to a determination that the noise level is greater than the threshold noise level, reducing the speed of the plurality of rotor blades of the first pair of rotors.

9. The method of claim 1, comprising:
measuring, after the reducing the speed of the plurality of rotor blades of the first pair of rotors, a total thrust produced by the first and second pairs of rotors;
comparing the total thrust produced by the first and second pairs of rotors to a threshold thrust level; and
responsive to a determination that the total thrust produced by the first and second pairs of rotors is less than the threshold thrust level, increasing a speed of the plurality of rotor blades of the pair of rotors.

10. The method of claim 1, wherein the reducing the speed of the plurality of rotor blades of the first pair of rotors is done automatically by a flight control system of the tilt-rotor aircraft.

11. A method of reducing a noise level of a tilt-rotor aircraft in an airplane mode, the method comprising:
operating the tilt-rotor aircraft in the airplane mode, in which mode a second pair of rotors of the tilt-rotor aircraft generates turbulent air and a first pair of rotors of the tilt-rotor aircraft ingests at least some of the turbulent air, wherein the first pair of rotors are supported by and coupled to a first rotatable shaft extending through a fuselage and the pair of rotors are supported by and coupled to a second rotatable shaft extending through the fuselage;
reducing a pitch of a plurality of rotor blades of the first pair of rotors to be less than a pitch of a plurality of rotor blades of the pair of rotors, thereby reducing noise generated by each of the first pair of rotors and the pair of rotors;
wherein the first pair of rotors are positioned in-line with and aft of the pair of rotors; and
wherein an axis of rotation of the first pair of rotors and the pair of rotors are co-linear.

12. The method of claim 11, comprising measuring a noise level of the first pair of rotors.

13. The method of claim 11, wherein the tilt-rotor aircraft comprises a third pair of rotors.

14. The method of claim 13, wherein the third pair of rotors are positioned out of line with the first pair of rotors.

15. The method of claim 13, comprising setting a pitch of a plurality of rotor blades of the third pair of rotors to be equal to the pitch of the plurality of rotor blades of the first pair of rotors.

16. The method of claim 13, comprising setting a pitch of a plurality of rotor blades of the third pair of rotors to be greater than the pitch of the plurality of rotor blades of the first pair of rotors.

17. The method of claim 13, comprising setting a pitch of a plurality of rotor blades of the third pair of rotors to be less than the pitch of the plurality of rotor blades of the first pair of rotors.

18. The method of claim 13, comprising:
measuring, prior to the reducing the pitch of the plurality of rotor blades of the first pair of rotors, a noise level of the first pair of rotors; and
determining if the noise level exceeds a threshold noise level.

19. The method of claim 18, comprising:
measuring, after the reducing the pitch of the plurality of rotor blades of the first pair of rotors, the noise level of the first pair of rotors;
determining if the noise level is below the threshold noise level; and
responsive to a determination that the noise level is greater than the threshold noise level, reducing the pitch of the plurality of rotor blades of the first pair of rotors.

20. The method of claim 18, the method comprising:
measuring, after the reducing the pitch of the plurality of rotor blades of the first pair of rotors, a total thrust produced by the first and second pairs of rotors;
comparing the total thrust produced by the first and second pairs of rotors to a threshold thrust level; and
responsive to a determination that the total thrust produced by the first and second pairs of rotors is less than the threshold thrust level, increasing the pitch of the plurality of rotor blades of the second pair of rotors.

* * * * *